United States Patent [19]
Ludwig

[11] 3,786,701
[45] Jan. 22, 1974

[54] DEVICE FOR CUTTING URETHANE FOAM
[76] Inventor: Eugene A. Ludwig, 1106 Greene St., Magnolia, Ark. 71753
[22] Filed: Nov. 5, 1971
[21] Appl. No.: 196,111

[52] U.S. Cl............................. 83/1, 83/4, 83/427, 83/428, 83/565, 83/651.1
[51] Int. Cl........................... B26d 3/10, B26d 3/28
[58] Field of Search..... 83/1, 4, 171, 428, 433, 565, 83/651.1, 427, 925 CC

[56] References Cited
UNITED STATES PATENTS

| 3,236,128 | 2/1966 | Holden | 83/4 |
| 3,242,779 | 3/1966 | Mona | 83/4 |
| 3,186,271 | 6/1965 | Kaiser | 83/4 |
| 2,789,199 | 4/1957 | Bjorsten | 83/171 |
| 3,691,886 | 12/1972 | Elsworth | 83/701 X |
| 3,212,376 | 10/1965 | Berenbak et al | 83/4 |
| 3,540,336 | 11/1970 | Kelsey | 83/565 X |
| 41,034 | 12/1863 | Vrooman | 83/565 X |
| 3,304,820 | 2/1967 | Muller et al | 83/925 CC |
| 3,559,524 | 2/1971 | Glastra | 83/925 CC |
| 17,840 | 7/1857 | Kendall | 83/427 X |

FOREIGN PATENTS OR APPLICATIONS

| 805,836 | 12/1958 | Great Britain | 83/428 |
| 548,727 | 9/1956 | Italy | 83/171 |

Primary Examiner—J. M. Meister
Attorney, Agent, or Firm—Harvey B. Jacobson et al.

[57] ABSTRACT

A cutting device for urethane foam and the like, said device comprising a carriage adapted to advance a bun or slab or urethane material through a cutter assembly including groups of elongated cutting wires which are heated and oscillated longitudinally to clean the wires as the material is advanced, one group of cutting wires being adapted to follow a vertical relief pattern, thereby cutting a corresponding pattern in the material.

8 Claims, 6 Drawing Figures

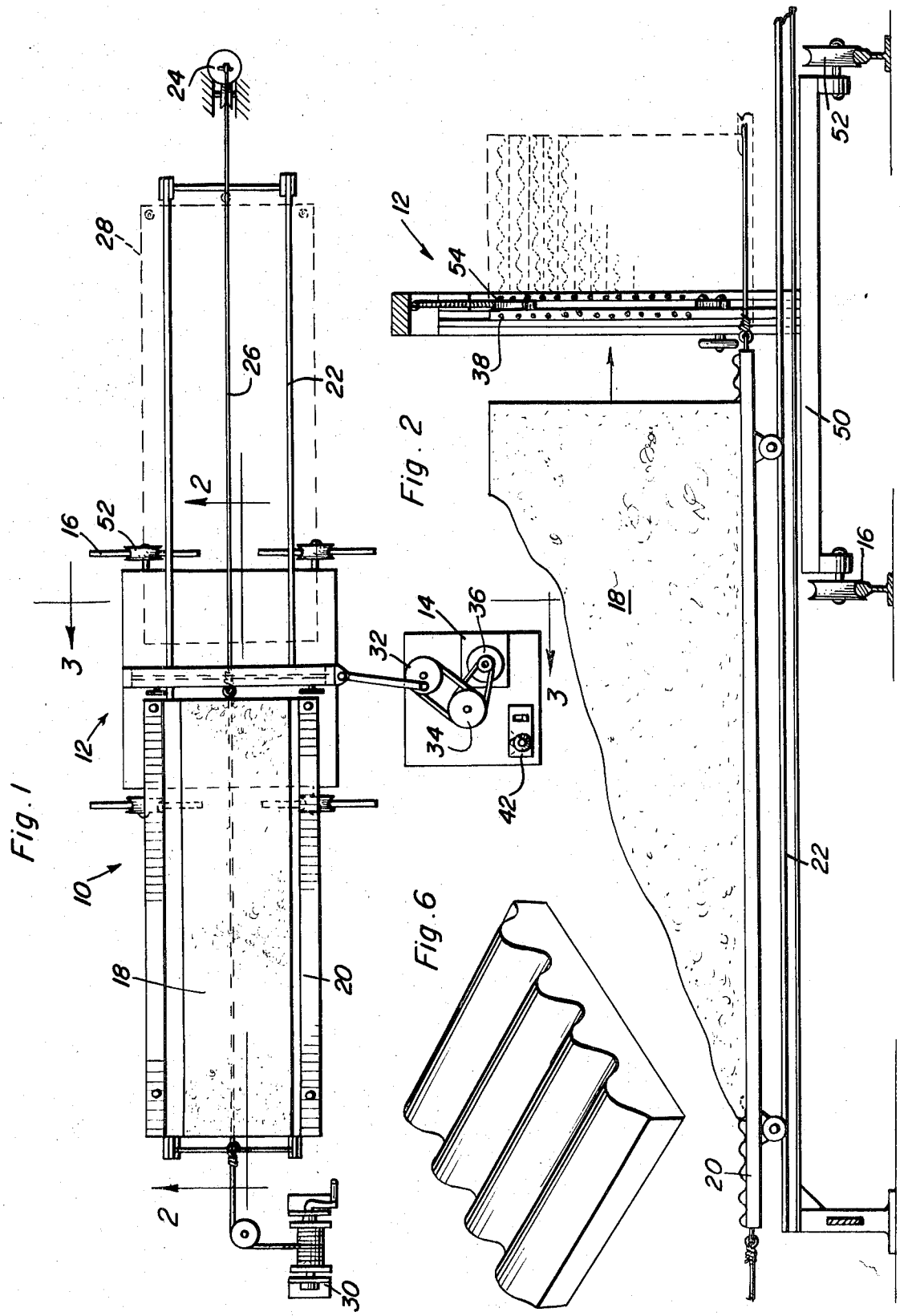

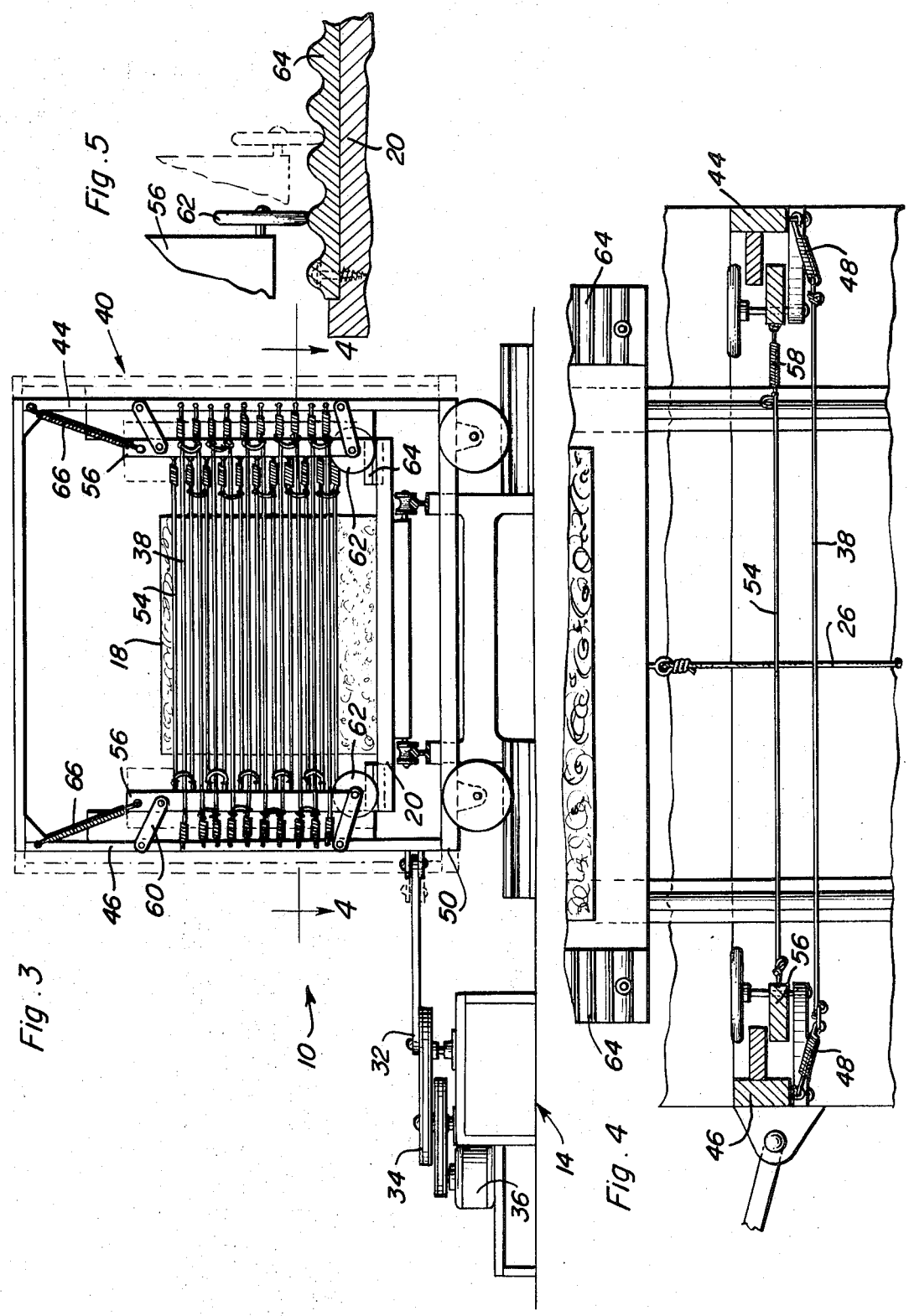

DEVICE FOR CUTTING URETHANE FOAM

The present invention is generally related to cutting devices and, more particularly, to heated wire cutting devices for fusible materials and the like.

In recent years, it has become common to cut and shape many fusible solid materials by moving them past a resistance heated cutting wire which readily severs the material when coming in contact with such. While this cutting technique has been accepted as a most economical method of cutting fusible materials, it has proven to be unsatisfactory for the cutting of several modern materials such as CPR urethane rigid foam which is produced by Upjohn Company and Dow Chemical Company. The melted urethane material obtains a gum-like consistency which tends to build up on the hot cutting wires, thereby preventing a satisfactory cut of the material without constant cleaning of the wires. Accordingly, it has been necessary to utilize more conventional cutting devices, such as band and circular saws, which increase the costs of the cutting operation.

Therefore, it is an object of the present invention to provide a wire cutting device for severing urethane foams and the like which may be operated to achieve satisfactory cutting results without the need for constantly cleaning the cutting wires.

Another object of the present invention is to provide a novel cutting device for urethane foams and the like, the device including a cutting wire assembly which is oscillated transversely to the direction of the cut, thereby eliminating gum-like buildups on the wires which previously required cleaning attention to assure a satisfactory cut.

It is a further object of the present invention to provide a unique cutting device for urethane foam and other fusible materials, the cutting device including a wire assembly adapted to follow a pattern for relief cutting of the material.

Still another object of the present invention is to provide a versatile cutting device including an assembly adapted to maintain proper tension upon oscillating cutting wires as they follow a pattern to produce a relief cut.

It is another object of the present invention to provide a unique cutting device which includes a relatively small number of moving parts, is durable, long-lasting, yet relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIG. 1 is a plan view of the cutting device of the present invention.

FIG. 2 is a sectional view taken along section 2—2 of FIG. 1.

FIG. 3 is a sectional view taken along section 3—3 of FIG. 1.

FIG. 4 is a sectional view taken along section 4—4 of FIG. 3.

FIG. 5 is a partial sectional view of a typical relief pattern associated with the cutting device of the present invention and illustrated in an engagement with a pattern guide wheel.

FIG. 6 is a partial perspective view of a typical piece of urethane foam or similar material cut by the device of the present invention.

Referring now, more particularly, to FIGS. 1–3, the present invention is generally indicated by the numeral 10 and includes a cutting assembly 12 operatively connected to a reciprocal or oscillatory drive mechanism 14 for reciprocation along rails 16. A slab or bun 18 of rigid urethane foam or the like is mounted on a carriage 20 which is advanced along a pair of guide rails 22 under the influence of a suspended weight 24 connected to the carriage by way of a cable or rope 26. When the weight is released from its raised position, by means not illustrated, carriage 20 advances to the right, as illustrated in FIGS. 1 and 2, to move the urethane foam through cutting assembly 12, which is oscillated transversely of the direction of the cut. When the carriage 20 reaches the end of travel, indicated at 28, the cut material is removed and the carriage may be returned by way of a cable crank 30, or similar mechanism. If desired, the carriage may be advanced by means other than a weight, such means including motors and similar devices which are well known.

Preferably, the oscillatory drive mechanism includes a crank and pitman assembly 32 which may be driven by a conventional power transmission means such as a belt and pulley arrangement indicated at 34 connected to a drive motor 36. It should be noted, however, that other oscillatory drive systems which are well known may be utilized, if desired.

Referring, more particularly, to FIGS. 2 and 3, it can be seen that the cutting assembly 12 includes a first plurality of elongated cutting wires 38 supported by a framework generally indicated by the numeral 40. Each wire is positioned in such a manner that the oscillatory motion is in a direction substantially parallel to the wires. Preferably, the cutting wires are of a nickel chromium alloy such as Nichrome V which provides adequate heating for cutting through the urethane foam. It has been found that satisfactory cutting results are obtained when applying approximately 45 volts AC to a 4 ½ foot length of Nichrome V cutting wire with a resistivity of 1.27 ohms per foot. If desired, the cutting wires may be connected in series to assure uniform heat distribution, and the voltage may be controlled by way of a Variac 42, or similar voltage control means.

Each of the cutting wires 38 is held between a pair of oppositely disposed support members 44 and 46 and is maintained in tension by way of coiled springs 48. It will be appreciated that support framework 40 is provided with a carriage 50 which is free to reciprocate transversely of the direction of the cut by way of wheels 52 resting on transverse rails 16.

Referring now, more particularly, to FIGS. 3–5, it will be appreciated that the cutting device of the present invention may be provided with a second group of cutting wires 54, which generally parallel cutting wires 38 but are vertically spaced therefrom. Each of these cutting wires extends between vertically movable support members 56 and is held in tension by way of springs 58. Each support 56 is moveably connected to support framework 40 by way of a pair of pivotal links 60 in such a manner to permit vertical movement of cutting wires 54 under the influence of guide wheels 62 which are adapted to follow vertical relief patterns 64.

The vertical relief patterns 64 may take various shapes and are mounted to carriage 20 on opposite sides thereof, such that as the cutting assembly and pattern guide wheels 62 are reciprocated transversely of the direction of the cut, the guide wheels follow the undulations formed in the vertical relief pattern. This, in turn, moves cutting wires 54 along a corresponding cutting path, thereby duplicating the shape of the pattern in the urethane foam. Since a plurality of movable cutting wires 54 are provided, together with a plurality of stationary cutting wires 38, several pattern cuts may be achieved on a single run. FIG. 6 is an illustration of a typical slab of urethane foam cut by the device of the present invention, the undulations on the upper surface corresponding to those of the vertical relief pattern.

It will be appreciated that counter weight springs 66 of the tension type may be mounted between support framework 40 and the top ends of movable support members 56. By selecting the proper spring tension, the weight of the movable cutting assembly upon the pattern guide wheels is substantially reduced, thereby making it easier for the guide wheels to follow the relief pattern.

The operation of the cutting device of the present invention may be described as follows: the desired cutting patterns 64 are selected and mounted to carriage 20 by way of screws or similar fastening means. The spacing between the cutting wires may be adjusted, as well as the tension. The carriage 20 is positioned to the extreme left, as illustrated in FIGS. 1 and 2, and the oscillatory drive mechanism 14 is energized together with Variac 42 to achieve the desired cutting wire temperature. Weight 24 is then released to advance carriage 20 to the right, thereby moving the bun of urethane foam 18 through the cutting assembly. After the cutting has been achieved, the carriage is returned to its initial position by way of crank mechanism 30, and the process may be repeated.

From the foregoing description, it will be appreciated that the cutting device of the present invention provides a versatile means for cutting urethane foams and the like without significant buildup of melted material upon the cutting wires. The transverse, saw-like action of the cutting wires provides satisfactory cleaning action, thereby permitting continuous cutting without the need for shutdown, cleaning or maintenance as was necessary with conventional cutting devices. Furthermore, the pattern-following mechanism provides an inexpensive means of duplicating patterns in the urethane foam without the use of complex and expensive mechanisms. It should be noted that minor changes in the mounting of the vertically movable members or the associated support framework, or the oscillatory drive system may be made as required, such being deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A material cutting and shaping device comprising a framework, at least one elongated cutting member carried by said framework, oscillation producing means operatively connected to said framework for producing longitudinal oscillation of said elongated cutting member, carriage means for advancing the material transversely past said cutting member, means supporting said framework for controlled transverse movement of said elongated cutting member relative to the direction the material is advanced, pattern means associated with said carriage means defining a path of said transverse movement of said framework and said cutting member, and follower means associated with said framework for following the shape of said pattern means and transversely moving said framework in a path corresponding to shape of said pattern means, said carriage means including a movable member carrying the material, said pattern means including a relief surface associated with said movable member, said follower means including a wheel connected to said framework and operatively engaging said relief surface, said means supporting said framework including a pair of oppositely disposed support members, said movable member passing between said support members, said support members being operatively connected to said oscillation producing means for movement substantially parallel to said cutting member, said device including a second cutting member mounted between said oppositely disposed support members to produce a substantially planar cut in the material, each of said cutting members including a cutting wire mounted in tension.

2. The structure set forth in claim 1 wherein said cutting wires are held in tension by springs connected to said framework and said support members respectively.

3. In combination, a framework, a carriage movable along said framework in a first predetermined path and including workpiece supporting means, a support supported for guided movement back and forth in a second predetermined path transverse to said first path, an elongated tension cutting member supported from said support in position extending generally parallel to said second path, support means supporting the opposite end portions of said cutting member from said support for shifting back and forth along further paths extending transverse to said first and second paths, said support means including support members pivotally attached to said support for oscillation relative thereto about parallel axes generally paralleling said first path and anchor means anchoring the opposite ends of said cutting member to said support members at points spaced radially of said parallel axes, said anchor means including means operative to maintain said cutting members tensioned throughout changes in the spacing between said points.

4. The structure set forth in claim 3 wherein said elongated cutting member includes a cutting wire.

5. The combination of claim 3 wherein said carriage includes relief pattern means extending along said first path, and follower means carried by said support members engaged with said relief pattern means for oscillating said support members in response to shifting of said carriage along said first path.

6. The combination of claim 3 wherein said support includes a second elongated cutting member supported therefrom in position paralleling said second path.

7. The combination of claim 3 wherein said anchor means comprises elongated tension springs.

8. The combination of claim 7 wherein said carriage includes relief pattern means extending along said first path, and follower means carried by said support members engaged with said relief pattern means for oscillating said support members in response to shifting of said carriage along said first path.

* * * * *